United States Patent [19]

Goscenski, Jr.

[11] 4,389,909
[45] Jun. 28, 1983

[54] CAM MECHANISM FOR LIMITED SLIP OR LOCKING DIFFERENTIAL

[75] Inventor: Edward J. Goscenski, Jr., Battle Creek, Mich.

[73] Assignee: Eaton Corporation, Cleveland, Ohio

[21] Appl. No.: 266,874

[22] Filed: May 26, 1981

[51] Int. Cl.$^3$ .......................... F16H 1/44; F16H 53/00
[52] U.S. Cl. .................................. 74/711; 74/710.5; 74/567
[58] Field of Search ...................... 74/711, 710.5, 567; 192/934, 70.23

[56] References Cited

U.S. PATENT DOCUMENTS

| | | | |
|---|---|---|---|
| Re. 28,004 | 5/1974 | Ottemann | 74/711 |
| 1,529,804 | 3/1925 | Nogrady | 74/711 |
| 3,572,165 | 3/1971 | Roper | 74/711 |
| 3,762,241 | 10/1973 | Roper | 74/711 |
| 3,831,462 | 8/1974 | Baremor | 74/711 |
| 4,238,013 | 11/1980 | Goscenski, Jr. | 74/711 |
| 4,265,143 | 5/1981 | Goscenski, Jr. et al. | 74/710.5 |
| 4,290,321 | 9/1981 | Wilson | 74/711 |

Primary Examiner—Kenneth Dorner
Assistant Examiner—D. Wright
Attorney, Agent, or Firm—C. H. Grace; L. J. Kasper

[57] ABSTRACT

A differential gear mechanism of the limited slip type is provided. The mechanism includes a clutch pack (35) and a cam mechanism (41) which are able to retard differentiating action of the differential gear means (19,23,25). A flyweight mechanism (51) is operable to actuate the cam mechanism, and to engage the clutch pack. The cam member (43) includes a cam surface (47) having alternating rising surface portions (61) and falling surface portions (63). These surface portions include pad portions (71,73), such that engagement with the mating cam surface (45) is limited to the area of the pad portion, thus making the transmittal of camming forces to the clutch pack more consistent and predictable.

9 Claims, 5 Drawing Figures

CAM MECHANISM FOR LIMITED SLIP OR LOCKING DIFFERENTIAL

BACKGROUND OF THE DISCLOSURE

The present invention relates generally to differential gear mechanisms, and more particularly, to such mechanisms of the type commonly referred to as "locking differentials".

Differential gear mechanisms of the type to which the present invention applies are broadly referred to as "limited slip differentials" and typically include a clutch pack which is operable to limit or retard differentiating action between the output gears. More specifically, however, the present invention is intended for use on limited slip differentials of the type referred to as "locking differentials", and will be described in connection therewith. In a locking differential, means are provided for engaging or locking the clutch set, rather than permitting it to slip, to substantially reduce the amount of differentiating action permitted between the output gears.

As one result of the general trend toward downsizing of automobiles, it has been necessary to similarly downsize many of the vehicle components, including locking differentials. The development and testing of smaller locking differentials has shown the necessity for closer tolerances in order to achieve the same levels of performance as were previously achieved on the larger units. With respect to the present invention, the term "level of performance" refers to the ability of a locking differential unit to engage the clutch pack (lock-up) within a specified time range. For example, in one commercial embodiment of a locking differential, once the "low traction" wheel begins to spin out until, and locking action is initiated, until that wheel stops spinning (i.e., the time required for the differential to lock) should be not less than 0.1 seconds, and not more than 0.5 seconds.

If the lock-up occurs in less than the specified minimum time (e.g., 0.1 seconds), there are two possible, undesirable conditions which can occur. First, if there is too rapid a build-up of torque in the clutch, impact-type forces are experienced, causing excessive stress and objectionable noise. A second possibility is that an engagement which occurs too abruptly will result in "cycling", a condition in which, due to the mass-spring rate of the drivetrain and tires, the unit alternately and rapidly engages and disengages. This condition is quite objectionable to the driver and can result in much more rapid fatigue of various system components.

On the other hand, if the engagement requires longer than the specified time (e.g., 0.5 seconds), a substantial amount of torque will continue to be transmitted to the clutch pack in the form of heat. At best, the result will be an undesirable overheating of the clutch pack, which in turn would make successive engagements even slower thus causing more heat. At worst, the excessive heat will damage frictional engaging surfaces (which could even cause clutch plates to "weld" together and then be torn apart) and start to destroy the oil within the system. This would severely limit the capacity of future engagements.

SUMMARY OF THE INVENTION

Accordingly, it is an object of the present invention to provide a differential gear mechanism which is capable of consistently achieving the engaged condition within the specified time range.

It is a more specific object of the present invention to provide a differential gear mechanism in which the camming force is transmitted by the cam mechanism to the clutch pack in a more uniform and consistent manner, from one unit to the next of a given design.

The above and other objects are accomplished by the provision of an improved differential gear mechanism of the type including a gear case defining a gear chamber, and differential gear means including at least one input gear and first and second output gears. The mechanism includes a lock-up means for locking up the differential gear means to retard differentiating action, and actuating means for actuating the lock-up means. The lock-up means includes clutch means operable between an engaged condition and a disengaged condition. The lock-up means further includes cam means associated with the clutch means and including first and second cam members. The second cam member is axially movable relative to the first cam member in response to relative rotation therebetween to effect an engaged condition of the clutch means.

The improvement comprises one of the first and second cam members having a cam surface including alternating rising surface portions and falling surface portions. Each of the rising surface portions includes an axially projecting pad portion extending over approximately half of the circumferential extent of the rising surface portion to limit the area of engagement of the other of the first and second cam members with the respective rising surface portion.

In accordance with another aspect of the present invention, the second cam member has a cam surface including alternating rising surface portions and falling surface portions. Each of the rising surface portions includes an axially projecting pad portion disposed to insure that the initial transmittal of force from the first cam member to said second cam member occurs consistently at a predetermined location on each of said rising surface portions.

DESCRIPTION OF THE PREFERRED EMBODIMENT

Figure 1:
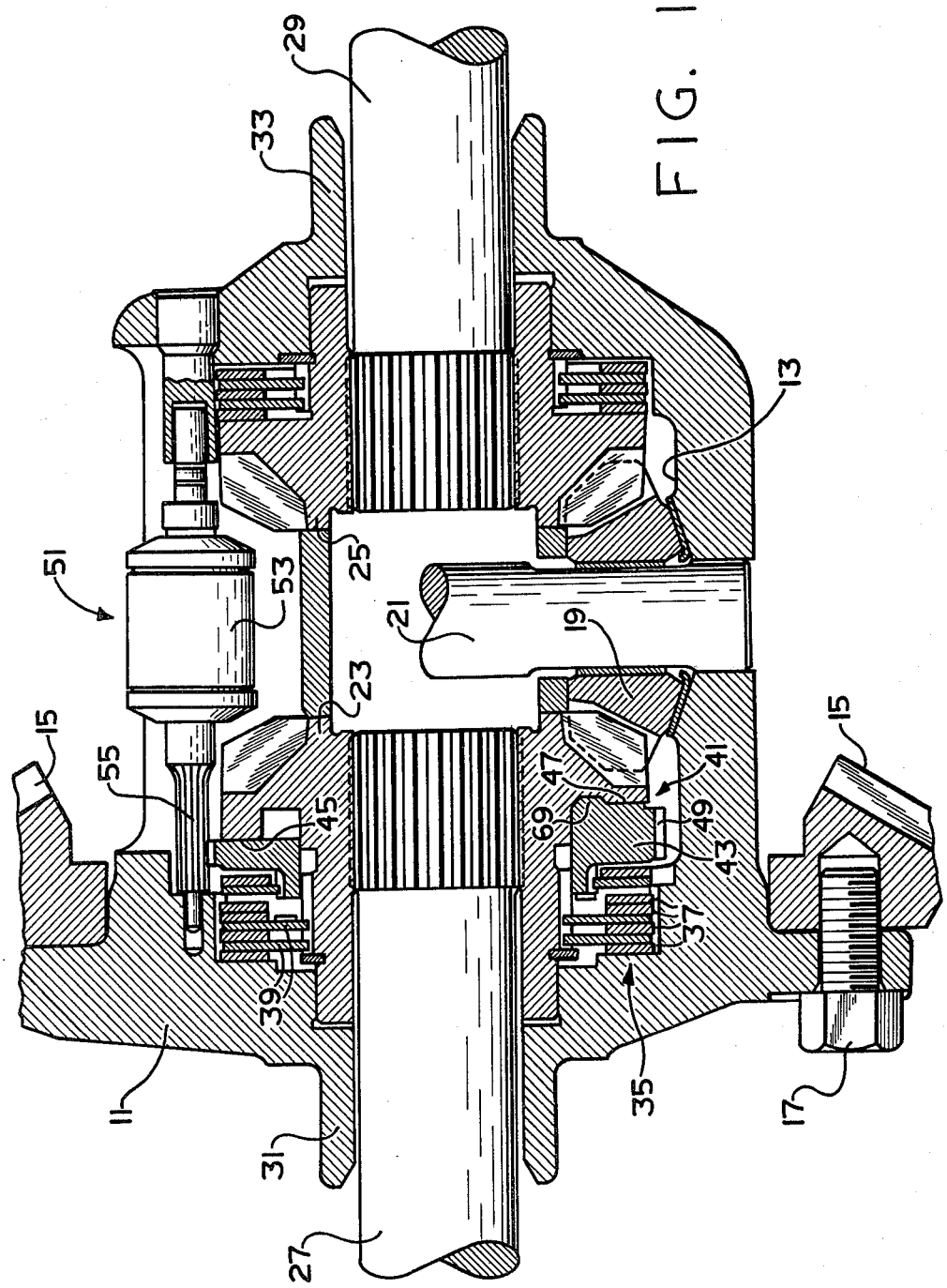
FIG. 1 is an axial cross section of a locking differential mechanism of the type with which the present invention may be utilized.

Referring now to the drawings, which are not intended to limit the present invention, FIG. 1 is an axial cross section of a locking differential gear mechanism of the type which may utilize the present invention. The differential gear mechanism includes a gear case 11 which defines therein a gear chamber, generally designated 13. Torque input to the gear mechanism is typically by means of an input gear 15 (shown only in fragmentary view in FIG. 1). The input gear 15 may be attached to the gear case 11 by means of a plurality of bolts 17.

Disposed within the gear chamber 13 is a differential gear set including a plurality of planet pinions 19 (only one of which is shown in FIG. 1), rotatably mounted on a pinion shaft 21. The pinion shaft 21 is secured to the gear case 11. The planet pinions 19 comprise the input gears of the differential gear set, and are in meshing engagement with a pair of side gears 23 and 25, which comprise the output gears of the differential gear set. The side gears 23 and 25 are splined to a pair of axle shafts 27 and 29, respectively. The gear case 11 includes annular hub portions 31 and 33, respectively, on which are mounted the bearing sets (not shown) used to provide rotational support for the differential gear mechanism, relative to the main, outer casing (also not shown).

During normal, straight-ahead operation of the vehicle, no differentiating action occurs between the left and right axle shafts 27 and 29, and the pinions 19 do not rotate relative to the pinion shaft 21. Therefore, the gear case 11, the pinions 19, the side gears 23 and 25, and the axle shafts 27 and 29 all rotate about the axis of the shafts 27 and 29, as a solid unit.

Under certain operating conditions, such as when the vehicle is turning, or a slight difference in the tire size exists, it is permissible for a certain amount of differentiating action to occur between the side gears 23 and 25, up to a predetermined level. Above that predetermined level of differentiating action (e.g., a difference of 100 rpm between the side gears, which would mean that normal operation or traction had been exceeded as in a wheel spin-out), it is desirable to retard the relative rotation between the gear case and the side gears, to prevent excessive differentiating action.

In order to retard differentiating action, the differential gear mechanism is provided with a lock-up means for locking up the differential gear set, and an actuating means for actuating the lock-up means. The general construction and operation of the lock-up means and actuating means are now well known in the art, and will be described only briefly herein. For a more detailed explanation of the lock-up means and actuating means, reference should be made to U.S. Pat. Nos. Re. 28,004 and 3,831,462, both of which are assigned to the assignee of the present invention, and both of which are incorporated herein by reference.

In the subject embodiment, the lock-up means comprises a clutch pack, generally designated 35, including a plurality of clutch discs 37 splined to gear case 11, and a plurality of clutch discs 39 splined to the side gear 23. The lock-up means further includes a cam mechanism, generally designated 41. As is well known to those skilled in the limited slip differential art, the primary function of the cam mechanism 41 is to effect movement of the clutch pack 35 from the disengaged condition shown in FIG. 1 to an engaged condition. In the engaged condition, the clutch pack 35 is effective to retard relative rotation between the gear case 11 and the side gear 23, thus retarding and minimizing differentiating action between the side gears 23 and 25.

The cam mechanism 41 includes the side gear 23 and a main cam member 43. The side gear 23 defines a cam surface 45, and the cam member 43 defines a cam surface 47. The cam member 43 also defines a set of external gear teeth 49, the function of which will be described subsequently. During normal, straight-ahead operation of the vehicle, with little or no differentiating action occurring, the cam surfaces 45 and 47 remain in the neutral position shown in FIG. 1, with the cam member 43 rotating with the side gear 23, at the same rotational speed. Movement of the clutch pack 35 to the engaged condition is accomplished by retarding rotation of the cam member 43, relative to the side gear 23, which causes "ramping" of the cam surfaces 45 and 47, resulting in axial movement of the cam member 43 to the left in FIG. 1.

In order to retard rotation of the cam member 43, relative to the side gear 23, the mechanism includes a retarding mechanism, generally designated 51, which comprises the actuating means for actuating the lock-up means. It should become apparent to those skilled in the art that within the scope of the present invention, many different configurations and types of retarding mechanism may be utilized. In the subject embodiment, the retarding mechanism 51 is of the flyweight type, illustrated and described in greater detail in above-cited U.S. Pat. No. Re. 28,004. The retarding mechanism 51 is mounted within the gear case 11 for rotation about its own axis and includes a cylindrical flyweight portion 53. The retarding mechanism 51 further includes an externally geared portion 55 which is in engagement with the external gear teeth 49 of the cam member 43. During operation, if differentiating action begins to occur between the axle shafts 27 and 29, and thus between the side gears 23 and 25, the side gear 23 and cam member 43 will begin to rotate in unison at a speed different than that of the gear case 11. As a result of this speed difference, the retarding mechanism 51 will begin to rotate about its axis at a rotational speed which is a function of the extent of the differentiating action. As the speed of rotation of the mechanism 51 increases, centrifugal force causes the flyweights 53 to move outward until one of the flyweights engages a stop mechanism (not shown in FIG. 1) preventing further rotation of the mechanism 51. When the retarding mechanism 51 stops rotating, the engagement of the geared portion 55 and the external gear teeth 49 causes the cam member 43 to rotate at the same speed of rotation as the gear case 11, which is different than the speed of rotation of the side gear 23, resulting in engagement of the clutch pack 35 as described previously.

Figure 2:
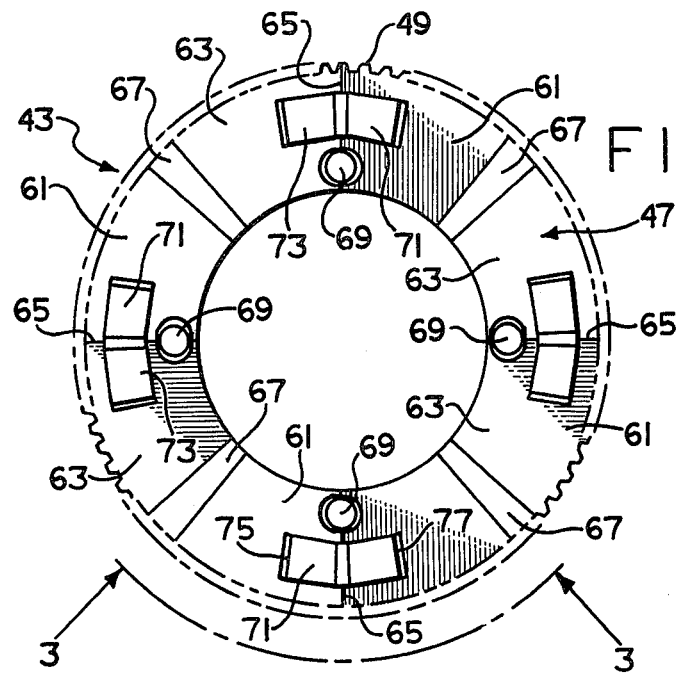
FIG. 2 is a plan view of one of the cam members embodying the present invention, and shown on the same scale as FIG. 1.
Figure 3:
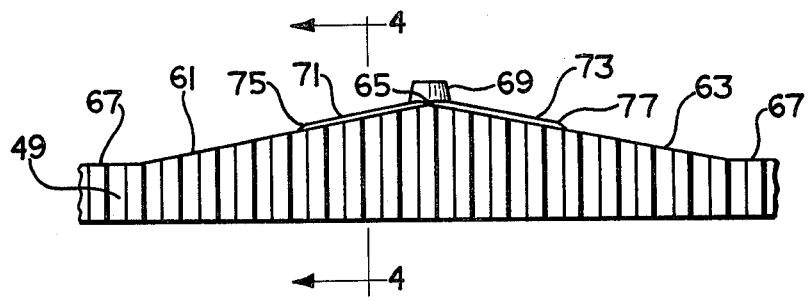
FIG. 3 is a fragmentary side view of the cam member shown in FIG. 2, but on a scale twice that of FIG. 2.
Figure 4:
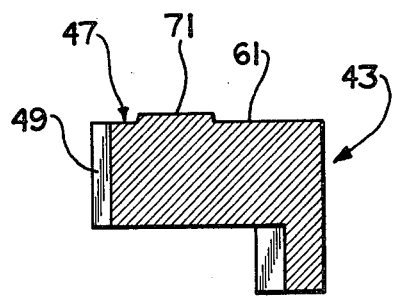
FIG. 4 is a fragmentary cross section, taken on line 4—4 of FIG. 3, and on the same scale as FIG. 3.

Referring now to FIGS. 2–4, the cam member 43 is shown in greater detail. FIG. 2 is a plan view of the cam member 43, illustrating the cam surface 47, as viewed in a direction toward the left in FIG. 1. The cam surface 47 comprises a plurality of alternating rising surface portions 61 and falling surface portions 63. It should be clearly understood that the terms "rising" and "falling" are based upon an assumed counterclockwise direction of travel around the cam member 43. If the direction of travel were in the clockwise direction, the surface portions which were considered "rising" will now be considered "falling" and vice versa. Each of the rising surface portions 61 meets the next (in a counterclockwise direction) falling surface portion 63 at a surface peak 65, while being separated from the preceeding falling surface portion 63 by a flat, valley surface 67. Disposed on each of the surface peaks 65 is a small frusto-conical protrusion 69 which engages a corresponding recess or detent (not shown) in side gear 23 as illustrated and described in greater detail in above-cited U.S. Pat. No. 3,831,462.

In the prior art differential gear mechanisms, during the ramping or camming action between the cam surfaces 45 and 47, each of the rising surface portions 61 is in engagement with a corresponding surface portion on the cam surface 45. Therefore, the axial force being transmitted to the clutch pack 35 would, in theory, be applied uniformly over a major portion of each of the rising surface portions 61. However, it will be understood by those skilled in the art that in view of manufacturing tolerances, the force being transmitted through the cam member 43 to the clutch pack 35 will not be distributed uniformly over the surface portion 61. Instead, the force will tend to be concentrated at some point, or within some region, of the surface portion 61, as it engages the cam surface 45.

In accordance with the present invention, each of the rising surface portions 61 is provided with a pad portion 71 which projects slightly in an axial direction from the surface portion 61. Similarly, each of the falling surface portions 63 is provided with a pad portion 73 projecting slightly in an axial direction from the surface portion 63. In the subject embodiment, the pad portions 71 and 73 are disposed over the upper half of their respective surface portions 61 and 63. It has been hypothesized that, by limiting engagement with the corresponding cam surface 45 to that area provided by each of the pad portions 71 (or each of the pad portions 73), the transmission of forces to the clutch pack 35 is more predictable and consistent, thus substantially reducing the percentage of units in which engagement is either too fast or too slow.

In the subject embodiment, the pad portion 71 and 73 are illustrated as comprising one continuous pad. However, it should be clearly understood that the invention is not so limited, and the pad portions 71 and 73 may have various configurations and be located at various positions on the surface portions 61 and 63, respectively. In addition, although the pad portions 71 and 73 are illustrated as being disposed over generally the radially outermost half of the surface portions 61 and 63, respectively, such disposition is not an essential feature of the invention, but is necessitated in the subject embodiment partly by the presence of the projections 69.

Figure 5:
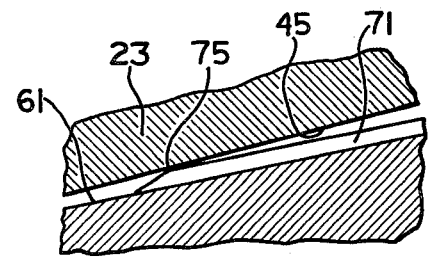
FIG. 5 is a fragmentary cross section illustrating engagement of the pad portion of the present invention with the mating cam surface.

Referring now to FIG. 5, in conjunction with FIGS. 2 and 3, a further detail of the subject embodiment is illustrated. The pad portions 71 and 73 define leading edges 75 and 77, respectively. Preferably, the cam surface 45 is oriented at a slightly greater angle than either the surface portion 61 or the surface of the pad portion 71. This is shown in FIG. 5, in which the relative angles are exaggerated for illustration purposes. Therefore, as the cam surface 45 "ramps up" the surface portion 61, engagement with the cam surface 45 occurs primarily at the leading edge 75. It is believed that this may have two advantages: first, initial application of camming force always occurs at the same region on each of the surface portions 61; and second, as the cam surfaces ramp up relative to each other, the camming force continues to be applied at the same region. It is also believed that, depending upon the angles selected, as the applied camming force gradually increases, the area of engagement also increases. It has been found through actual testing of differential gear mechanisms, that the use of the present invention substantially reduced the occurrence of engagements which were either too fast or too slow. In one particular series of tests involving ten units made in accordance with FIG. 1, when the units were not equipped with the present invention, only one out of ten engaged within the specified time range. However, when the same ten units were equipped with the present invention, nine out of ten engaged within the specified time range.

Thus, it may be seen that the present invention provides more predictable and consistent transmission of camming forces to the clutch pack by reducing the area over which the camming force is applied to the cam member and/or insuring that the application of camming force occurs in about the same region on each of the rising surface portions. It is believed to be within the knowledge of those skilled in the art to make various other alterations and modifications of the invention, and it is intended that all such alterations and modifications be included as part of the invention, insofar as they come within the scope of the appended claims.

What is claimed is:

1. A differential gear mechanism of the type including a gear case defining a gear chamber, differential gear means disposed in said gear chamber, said differential gear means including at least one input gear and first and second output gears, lock-up means for locking up said differential gear means to retard differentiating action, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween to effect said engaged condition of said clutch means; the improvement comprising:

one of said first and second cam members having a cam surface including alternating rising surface portions and falling surface portions, each of said rising surface portions including a pad portion axially projecting slightly from said rising surface portion and extending over approximatey the upper half of said rising surface portion to concentrate engagement of the other of said first and second cam members with said rising surface portion on said upper half of said rising surface portion.

2. A differential gear mechanism of the type including a gear case defining a gear chamber, differential gear means disposed in said gear chamber, said differential gear means including at least one input gear and first and second output gears, lock-up means for locking up said differential gear means to retard differentiating action, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween to effect said engaged condition of said clutch means; the improvement comprising:

one of said first and second cam members having a cam surface including a plurality of pad portions axially projecting from said cam surface, said pad portions defining alternating rising surface portions and falling surface portions extending over approximately half of the circumferential extent of said cam surface to limit the area of engagement of the other of said first and second cam members with said rising and falling surface portions.

3. A differential gear mechanism of the type including a gear case defining a gear chamber, differential gear means disposed in said gear chamber, said differential gear means including at least one input gear and first and second output gears, lock-up means for locking up said differential gear means to retard differentiating action, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween to effect said engaged condition of said clutch means; the improvement comprising:

one of said first and second cam members having a cam surface including alternating rising surface portions and falling surface portions, each of said rising surface portions including an axially projecting pad portion disposed to insure that the initial transmittal of force from said first cam member to said second cam member occurs consistently at a predetermined location on each of said rising surface portions.

4. The improvement as claimed in claim 3 wherein the corresponding cam surface of the other of said first and second cam members is disposed at a slightly greater angle than said rising surface portion whereby the initial engagement of said corresponding cam surface and said pad portion is generally line-to-line.

5. A differential gear mechanism of the type including a gear case defining a gear chamber, differential gear means disposed in said gear chamber, said differential gear means including at least one input gear and first and second output gears, lock-up means for locking up said differential gear means to retard differentiating action, and actuating means for actuating said lock-up means, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween in either of two opposite directions to effect said engaged condition of said clutch means; the improvement comprising:

said second cam member having a cam surface including alternating rising surface portions and falling surface portions, each of said rising surface portions and each of said falling surface portions including a pad portion axially projecting slightly from said respective rising and falling surface portion and extending over approximately the upper half thereof to concentrate engagement of the first cam member surface with said rising and falling surface portions on said upper half thereof.

6. A differential gear mechanism of the type including a gear case defining a gear chamber, differential gear means disposed in said gear chamber, said differential gear means including at least one input gear and first and second output gears, lock-up means for locking up said differential gear means to retard differentiating action, and actuating means for actuating said lock-up means, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween in either of two opposite directions to effect said engaged condition of said clutch means; the improvement comprising:

said second cam member having a cam surface including a plurality of pad portions axially projecting from said cam surface, said pad portions defining alternating rising surface portions and falling surface portions extending over approximately half of the circumferential extent of said cam surface to limit the area of engagement of the first cam member surface with said rising and falling surface portions, each adjacent pair of rising and falling surface portions being of equivalent but opposite configuration.

7. A differential gear mechanism of the type including a gear case defining a gear chamber, differential gear means disposed in said gear chamber, said differential gear means including at least one input gear and first and second output gears, lock-up means for locking up said differential gear means to retard differentiating action, and actuating means for actuating said lock-up means, said lock-up means including clutch means operable between an engaged condition, effective to retard relative rotation between said gear case and said output gears, and a disengaged condition, said lock-up means further including cam means operatively associated with said clutch means and including first and second cam members, said second cam member being axially movable relative to said first cam member in response to relative rotation therebetween in either of two opposite directions to effect said engaged condition of said clutch means; the improvement comprising:

said second cam member having a cam surface including alternating rising surface portions and falling surface portions, each of said rising surface portions and falling surface portions including an axially projecting pad portion disposed to insure that the initial transmittal of force from said first cam member to said second cam member occurs consistently at a predetermined location on each of said rising surface and falling portions.

8. The improvement as claimed in claim 7 wherein the cam surface of said first cam member is disposed at a slightly greater angle than said rising surface portion.

9. The improvement as claimed in claim 7 or 8 wherein said predetermined location of initial force transmittal is approximately the midpoint, in a circumferential direction, of each of said rising surface portions.

* * * * *